J. L. Sayles,
Expanding Rock Drill.
N° 85,334. Patented Dec. 29, 1868
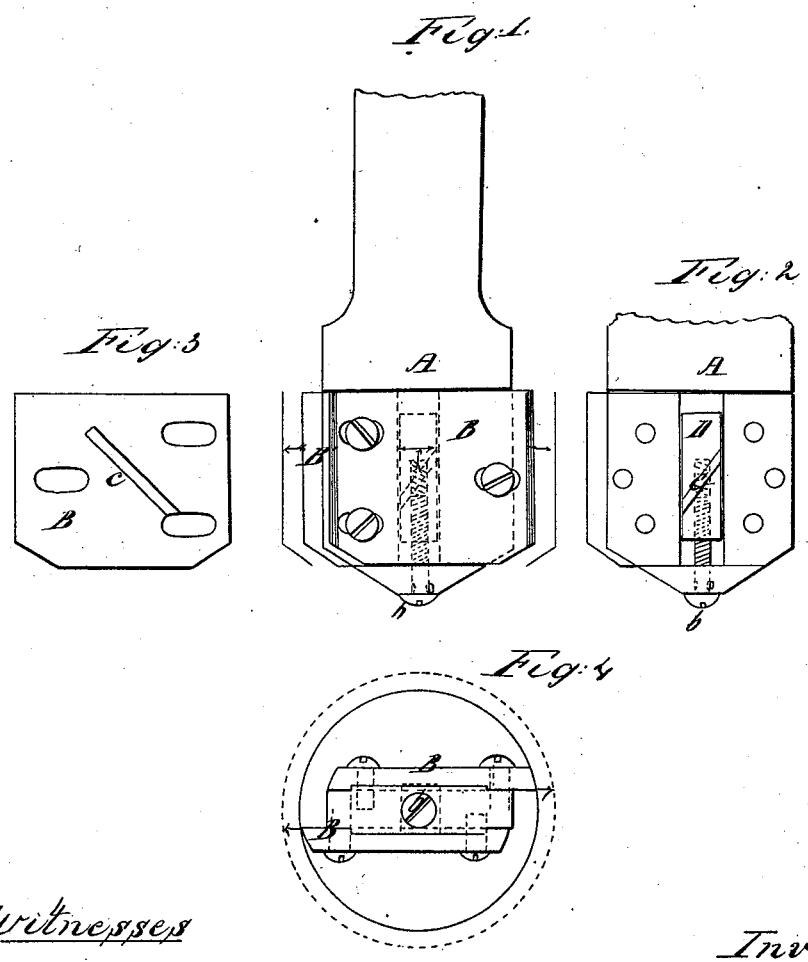
Witnesses
W. B. Vincent
G. B. Barrows
Inventor
Jeremiah L. Sayles

JEREMIAH L. SAYLES, OF GLOUCESTER, RHODE ISLAND.

Letters Patent No. 85,334, dated December 29, 1868.

IMPROVED EXPANDING DRILL.

The Schedule referred to in these Letters Patent and making part of the same.

*To all whom it may concern:*

Be it known that I, JEREMIAH L. SAYLES, of Gloucester, in the county of Providence, and State of Rhode Island, have invented a new and improved Expanding Drill; and I do hereby declare that the following specification, taken in connection with the drawings, making a part of the same, is a full, clear, and exact description thereof.

Figure 1 is a view of my improved drill.

Figure 2 is a view of the same, with one of the cutters removed.

Figure 3 is a view of one of the cutters detached, showing the under side.

Figure 4 is an end view.

The object of my invention is to produce an expanding drill, which shall be simple in its construction, easy of adjustment, and which, for durability, and in cost of manufacture, shall be superior to others now in use.

The chief objections to expanding drills are, first, their great expense; and, second, their want of durability, which, by reason of their complicated construction, they do not possess. These objections I have endeavored to overcome in my drill, which I will now proceed to describe.

A is a piece of metal, made in proper shape, and mortised near the end, for the purpose of receiving a slide, D, fig. 2, having, upon each side, an inclined tongue, *a*, and is drawn backward and forward within the mortise by means of a screw, *b*.

Upon each side of the piece of metal A, cutters B and B' are slightly "let in," and are held in place by screws, each cutter having, upon its inner surface, an inclined groove, *c*, which receives the tongue upon the slide D.

The drill may be adjusted to any desired size within its compass in the following manner:

Loosen the screws which hold the cutters B and B', and turn the screw *b* to the right or left, as expansion or contraction may be desired; and the slide D, moving in its place, will, by reason of the tongue *a* in the groove *c*, cause the cutters to move in a direction opposite to each other, the tongues, upon each side of the slide D, being of opposite inclination; and the drill will increase or diminish in width, as may be required, the screws passing through slots, which permit the cutters to be moved in either direction.

When the cutters have been sufficiently expanded or contracted to make the drill of proper width, the screws which hold the cutters are again tightened, and the drill is ready for use.

The screw *b* is provided with an annular groove near the head, to receive a pin, which passes through the end of the drill, and, while it permits the screw to turn easily, prevents it from coming out.

What I claim as my invention, and desire to secure by Letters Patent, is—

The combination of the tongued slide D with the screw *b* and cutters B and B', the whole constructed and arranged substantially as described, for the purposes specified.

JEREMIAH L. SAYLES.

Witnesses:
G. B. BARROWS,
W. B. VINCENT.